Sept. 14, 1965  C. F. HUTCHEON ETAL  3,205,732
ROTARY CUTTING DIE
Filed Dec. 9, 1963
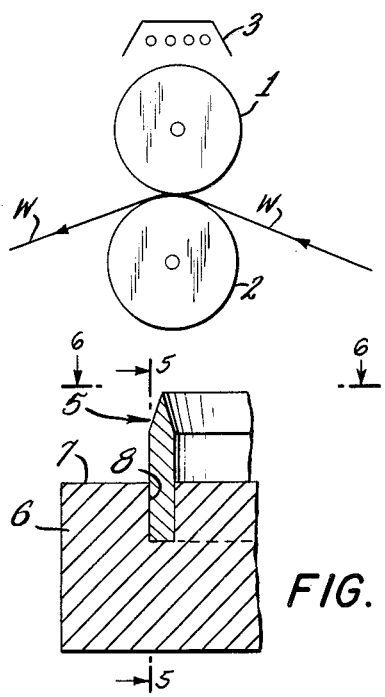
FIG. 1
FIG. 3
FIG. 4
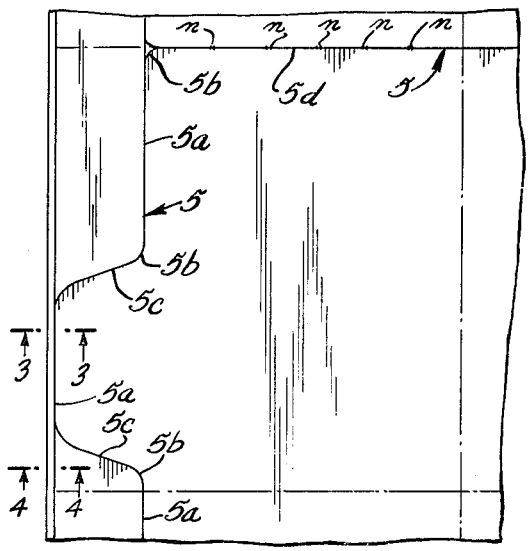
FIG. 2
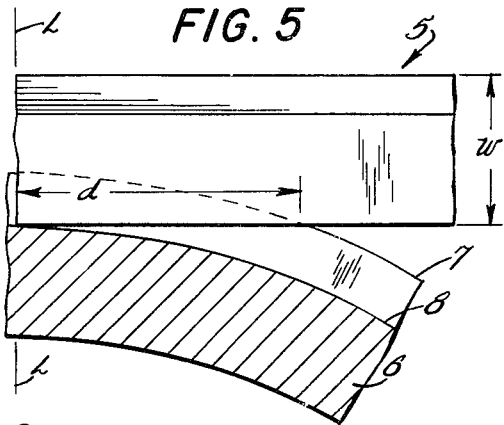
FIG. 5
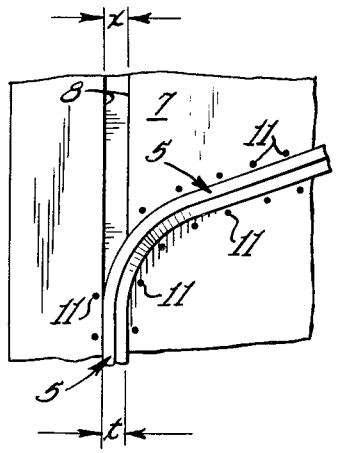
FIG. 6
INVENTOR.
CHARLES F. HUTCHEON
DONALD C. LINDLEY
BY
Leonard H. King
ATTORNEY United States Patent Office 3,205,732
Patented Sept. 14, 1965

1

3,205,732
ROTARY CUTTING DIE
Charles F. Hutcheon, Roslyn Heights, and Donald C. Lindley, Hempstead, N.Y., assignors to Cellu-Craft Products Corp., New Hyde Park, N.Y.
Filed Dec. 9, 1963, Ser. No. 329,194
8 Claims. (Cl. 76—107)

This invention relates to rotary cutting dies.

Rotary cutting dies as heretofore used, have generally taken the form of a cylinder which is hobbed or routed so as to remove most of the cylinder surface and to leave only comparatively thin radially protruding elements, which are then sharpened to form cutting edges.

For production involving small runs, the die cost is excessive and for quantity production capable of absorbing such a high initial cost, the expense of down time involved in resharpening and repairing the rotary die have been excessive. In consequence, the use of such dies has been limited and work which would otherwise appear ideally adapted to high speed rotary web operation has actually been done on flat bed die cutting machines, or by cutting a number of superposed layers simultaneously by the use of hand guided saws.

It is an object of the invention to provide a rotary cutting die which is simple and inexpensive to manufacture and recondition or repair.

Since it is comparatively simple to slit a web longitudinally or cut it transversely or to perform any of various punching operations with high speed rotary equipment, it is possible to produce fairly complex shapes by using a die cylinder with replaceable cutting elements formed and ground to the proper contour before insertion into the cylinder and to synchronize the operation of such a die cylinder with other heating and cutting equipment. The present invention permits the production of pieces involving longitudinal, transverse and slanted or curved cuts with a single cylinder. The operation is thus very much simplified, particularly where a variety of pieces are produced, it being necessary only to change the die cylinder or, in some cases, the die cylinder and back up roller in order to change from the production of one piece to another.

In producing a cylinder according to the invention, the cylinder surface is first grooved to a uniform depth and width, following the outline of the piece or pieces to be cut and a cutting blade, initially in the form of a straight strip ground to the required cutting edge along one side, is inserted in the groove, the metal to both sides of the strip being peened at suitable intervals, or continuously, so as to hold the strip securely, and the strip being continuously deformed as inserted. The percentage of deformation involved in accommodation to the curve of the cylinder exceeds the elastic limit, so that the blade strip acquires a permanent set with only a moderate spring back, but is kept well within the ultimate elongation of the blade material. The required deformation of the blade is readily obtained by pounding it into place in its groove by means of a rawhide mallet or similar surfaced device which will exert the required force without damaging the edge of the blade. The time consumed in blade insertion and replacement is very small and requires neither special equipment nor specially trained personnel, so that it can readily be done in the plant where the dies are used, thus reducing both cylinder expense and down time to a minimum.

A rotary die cutting cylinder and method of producing the same which embody the invention in a preferred form will now be described with reference to the accompanying drawing, and the features forming the invention will then be pointed out in the appended claims.

2

In the drawing:
FIG. 1 is a schematic side elevation of a rotary die cutting apparatus according to the invention;
FIG. 2 is a developed view of part of the surface of the rotary die cylinder of FIG. 1;
FIG. 3 is a much enlarged section on the line 3—3 of FIG. 2;
FIG. 4 is a similar section on the line 4—4 of FIG. 2;
FIG. 5 is a section on the line 5—5 of FIG. 3, and showing the process of inserting the blade;
FIG. 6 is a view looking in the direction of the arrows 6—6 of FIG. 3, and showing a portion of the cylinder surface to the same scale as in that figure.

The machines in which the rotary die of the present invention is used may be identical to those previously used with rotary die cutters manufactured by previous methods. The essential elements in such equipment comprise a rotary die cutting cylinder 1 and back up roller 2 (either driven with the die cylinder 1, or rotating freely depending on the requirements of the work). The web W passes through the nip in the cylinders 1, 2, being cut by the cylinder 1 as it does so. Cylinders 1 and 2 are mounted, as usual, so as to maintain the required pressure between them for feeding the web and producing the desired cutting action. Such mounting mechanism being conventional and in itself forming no part of the present invention, is not shown. A heater 3 may be associated with the die cylinder 1 for maintaining it at a suitable temperature (as, for example, 350° F.) whenever the nature of the material being cut makes this desirable.

FIG. 2 shows one (circumferential) half of one end of the surface of the cylinder 1 in developed form, and shows an arrangement of the cutting edge suitable for cutting out a synthetic resin book cover such as shown in prior Lindley application, Serial No. 244,181, filed December 12, 1962, for Book Cover, now abandoned. It will be understood that this particular form of cutter is shown by way of example only, the invention being adapted, as will appear clearly in the course of the following description, to the production of configurations of practically any shape which may be desired.

In the arrangement shown, the knife 5 has portions 5a running in a true circumferential direction, portions 5b running in a generally helicoidal curve and corresponding to a circular arc 5b in the developed view, portions 5c running at a slight angle to an axial element of the cylinder surface and portions 5d running axially of the cylinder. In general, the knife may be bent to almost any desired configuration of cut, as will be apparent from the fact that practically any such configuration can be developed by combining portions of the types indicated in varying lengths and relationships.

The cylinder preferably takes the form of a pipe or tubular element 6 (FIGS. 3–5), which is supported by a shaft and suitable disc element. It is turned or otherwise provided with a suitably accurately concentric cylindrical surface 7 and a groove 8 of uniform depth and width is cut into the cylinder. This work may be done by the usual so-called pantograph engraving equipment. Where the groove runs circumferentially for considerable distances, circumferential grooves may be turned in the cylinder around its entire circumference, thus reducing cost of preparation, part of such grooves being used for holding the supporting circumferential knife portions 5a and part of them (FIG. 4) being left empty.

The groove depth and width are, of course, selected with reference to the cutting knife to be used and in relation to factors which will be made clear in the following description.

In the particular rotary die cylinder selected by way of illustration, the cutting element 5 takes the form of commercially available preground band knife steel strip, presently available at a retail cost of about thirty cents per foot. Since the costs involved in preparing the cylinder are those for the metal shell 6 itself, the cutting of the groove 8, the cost of the blade material 5, the labor involved in its insertion in the groove, it will be apparent that the cost of preparing a cylinder according to the present invention is so low as to be negligible in comparison with preparation of a comparable cutting cylinder by previous methods.

The strip 5 is available in the convenient form of rolls and as unwound from the roll is substantially straight (strip 5 to the right of FIG. 5). The strip has a width $w$ of 3/16 inch and a thickness of $t$ of .028 inch. The edge portion is ground to form the desired angle at the cutting edge and the bevels to each side of the edge occupy approximately one-third the width $w$ of the blade 5. The cylinder groove 8 as initially cut has a uniform width $x$ such as to permit easy insertion of the blade, as, for example, a width of .030 inch with a plus tolerance of a few thousandths. The depth of the groove is preferably approximately one-third of the knife width $w$ and in the specific example chosen for illustration is .080 inch. The tolerance on the location of the groove bottom depends upon the class of work being done (i.e., on the tolerance from true concentricity of the blade edge which is permissible), and the cutting of the groove to required depth with the required accuracy presents no difficulty.

It will be noted that the blade has a width (.188 inch) which is over six times its thickness (.028 inch), the radius of gyration of the blade section (FIG. 3) about its axial principal axis being about five times its radius of gyration about its radial principal axis. Under these conditions, it would normally be expected that when the blade is bent (in the plane of its width) to a circle of six or twelve inches diameter, the effect would be to deform it into a frusto-conical or rippled configuration. It has been found, however, that the blade material of tough steel such as the band saw strip referred to (hardness, 45 Rockwell) will bend without difficulty in the plane of its width and that the center plane of the strip passing through its edge remains radial in the circumferential courses 5$a$ and also in the slanted and curved courses 5$b$ and 5$c$.

In inserting the blade in the cylinder, an end is placed in the groove 8 at any convenient point, as, for example, at the end L of an arc 5$b$ and the metal to each side is peened as at points 11 so that the blade is firmly gripped. The blade is bent or flexed in a plane at right angles to its side faces so as to conform to the groove curvature. Starting from the point of full insertion, line L of FIG. 5, which will be either the end of the blade or an intermediate point, the edge of the blade will be tangent to the bottom of the groove 8 and extend chordwise of the cylinder until it emerges from the groove. The extent of this chordal distance $d$ varies with the depth of groove 8 and with the diameter of the cylinder, varying from an inch or two to a greater distance. The chordal distance $d$ of the blade is a convenient portion to work on at one time. The peens 11 may be partly formed to each side of this portion of the blade, the peen points being spaced conveniently about three-quarters of an inch apart along the blade in its portions which are approximately axial or circumferential and closer together in its curved portions such as the portions 5$b$. The peening is done in the ordinary manner with a center punch or similar tool and hammer. In inserting a new blade in the cylinder, the cylinder metal to each side of the blade may be peened, while the blade is held in the groove by hand, or clamp, to get a snug fit across the chordal portion (length $d$). This portion of the blade is now pounded into place by using a rawhide hammer or similar tool which will not damage the cutting edge, striking in a radial direction against the blade edge. The chordal section $d$ having been bent to the curvature of the groove bottom, the metal to each side may again be peened so that the blade is securely held in its bent position. As will be apparent, the edge and back of the blade, originally of equal length, are deformed in a manner depending upon the blade width $w$ and cylinder diameter at the base of the groove 8. In a cylinder with six inch diameter and using a blade of three-sixteenths inches in width, it will be apparent that approximately a 6% difference in length is created, the blade being elongated along its cutting edge by about 4% and contracted at its back (against the bottom of groove 8) by about 2%, the neutral surface (approximately at the cylinder surface) indicating no change in length. Since the percentage of deformation is well within the ultimate elongation of the steel of the strip (around 15%) there is no danger of breaking or materially weakening the knife due to the bending. The deformation involved is, however, far beyond any deformation possible without permanent set. The lateral deformation (widthwise of FIG. 3) of the blade follows the deformation in the plane of bending, involving decrease in thickness $t$ at the base of the cutting edge of somewhat less than a thousandth of an inch and an increase in thickness at the back of the blade at the base of the groove 8. The joint formed between blade 5 and groove 8 is accordingly a (very slightly) dovetail fit. Considering, however, that the materials in question both as to groove and blade are tough steel, an increase of width $w$ at the back of the blade (amounting to about half a thousandth of an inch in the example discussed by way of illustration) provides an absolutely secure and solid locking of the blade in place on the cylinder, so that there is no tendency to dislodge the blade due to centrifugal or rolling forces or for the blade to displace laterally in either a vibratory or progressive manner.

If the cutting blade becomes dull or is damaged, the reconditioning of the cylinder involves merely the removal of the blade and replacement with a new one. The material cost, labor cost and down time involved in this operation being so small by comparison with what is required with previous die cutting cylinders having integral blades or with the formation of preformed and preground cutting elements, as to be negligible. The removal of the blade requires merely a pair of pliers and involves merely the grasping of one end and working it up out of the groove. The blade is now pulled progressively out of the groove. Since only a small lengthwise section of the blade is removed at any one time and since the straightening of the blade involved in pulling it out in a generally radial direction temporarily reduces its base thickness slightly, the blade is removed without any difficulty whatsoever in a quick and continuous operation. The replacement of the discarded blade with a new one follows exactly the procedure outlined above for putting the original blade in the cylinder. Since, however, the cylinder metal to each side of the grooving has already been peened so that the blade slides snugly into its blade position (FIG. 5) prior to pounding into place, the replacement operation is thus simpler and quicker than the original fitting of the blade to the cylinder. Where harder steel or steel subject to less work hardening in the cutting operation are required, they may be used without any alteration in the above described procedure, provided the elongation of the steel in question is sufficient. With materials having only 2 or 3% elongation, such as certain Stellite alloys having derived freedom from work hardening, and which may have only 2 or 3% ultimate elongation, the same procedure as described above may be followed with suitable heating of the steel as inserted. Such heating increases the elongation while the metal is hot, but without creating any plasticity and enables the insertion of steel blading in the manner described above with the assistance of only comparatively crude heating apparatus such as a torch and moderate heating of the portion to be pounded into place (approximately a chordal length $d$) with a torch, judging the temperature by time of application of the heat or by color where the temperature involved is high enough.

Rotary die cutters constructed in accordance with the invention may be utilized for cutting webs of synthetic resin sheet material, as, for example, polypropylene, vinyl and other sheeting, imitation leathers, textile materials, paper or other materials of fibrous, felted structure, and with or without heating of the die, depending upon the requirements of the particular material. The back up roller 2 may be, in accordance with usual practice, of any suitable material or materials, ranging from hard steel to resilient materials such as rubber.

The section of the cutting blade element is determined with reference to the material to be cut, the strip 5 being ground to a sharper or more obtuse edge angle according to the material to be cut and in accordance with usual practice, and the width $w$ being sufficient to furnish the required clearance between the cylinder surface generally and the edge of the blade. Ordinarily, there is no advantage in reducing the blade width $w$ below a 3/16 inch width or in increasing this width, unless such increase is required to furnish clearance in the radial direction between the cutting cylinder surface and back up cylinder 2. The width $w$ may be increased, if necessary, by an amount consistent with the elongation of the strip steel, and up to about as much as 3/8 inch, which is more than adequate for practically all conceivable applications. The ratio between width and thickness of the blade strip is also subject to variation, a ratio of about 6:1, as indicated, being satisfactory.

The proportions between blade width and thickness may be reduced considerably, wherever a thicker blade is preferred, and the extra cost of metal and of preparing blade strips is justified. For example, if the material being cut requires a more obtuse cutting edge and a comparable radial depth of the slant faces thereof, the blade thickness will be increased in proportion. It may also be advantageous to increase the relative thickness of the blade wherever the grooving of the cylinder can be materially facilitated by using a wider groove. Also, where a hollow ground edge is preferred, the thickness of the blade may be correspondingly increased for a cutting edge of equal angle. Under any or all of these conditions, a thickening of the blade in proportion to its width may prove desirable and may be provided for by merely widening a cylinder groove accordingly. The amount of thickening of the blade which may be had to meet particular requirements is, for practical purposes, not limited, it being practical to use blade strips in over-all proportions up to 1:1, subject to the requirement that the additional bending effort required in the (developed) plane of the cylinder be not excessive or result in distortion of the blade edge.

While the blade edge is normally continuous, as shown, the blade may be ground down along any lengths where it is desired not to cut the material, so as to produce intermittent cuts. In particular, and in the case of the particular cutting cylinder shown by way of illustration, the blade may be notched by grinding or filing at intervals, as along the axially extending straight portion 5d. The result of this notching will be to leave uncut nibs $n$ joining successive pieces which are cut out, permitting the rolling up of the cut out pieces as a unit and the separation of individual pieces from the roll by pulling on the pieces so as to break the nibs.

What is claimed is:

1. Method of making a rotary cutting die comprising grooving a cylindrical cutter support to a substantially uniform width and depth and following the outline of a cut to be made in sheet material, the said groove including portions having a substantial circumferential direction component, placing the end of a substantially straight hardened steel cutter blade strip in the said groove and securing it therein, with its back at the bottom of the groove, bending the strip adjacent the part so secured and progressively placing the rest of the strip piece in the said groove and securing it as so placed in position therein, the said strip being bent in its own plane to conform to the radial curvature of the groove and to a permanent set to approximately that curvature, but within the elongation of the metal.

2. Method according to claim 1, in which the strip is inserted in the radially curved portions of the groove in increments corresponding roughly to the chordal portion of the inbent part of the strip within the groove and securing is done by peening the support at both sides of the strip through the length of such portion.

3. A rotary cutting die comprising:
   (a) a cylindrical cutter support having a surface groove, defined by spaced sidewalls and a base portion, at least one length of the groove extending at an angle to the longitudinal axis of said support; and
   (b) an elongated cutter blade strip defined by a body portion having a base seated in close gripping relationship with the groove of said cylindrical support and an integral outwardly facing cutting edge spaced from said cylindrical support, said body portion being characterized, in a vertical, cross sectional plane, by a tapered configuration broader at said base and narrower proximate said cutting edge, said blade having said tapered configuration along the length of said blade disposed in the cutter support groove at an angle to a plane passing through the longitudinal axis of said cutter support.

4. The apparatus of claim 3 wherein the cutting edge of said blade is notched at spaced intervals to produce a discontinuous cut in the workpiece.

5. The apparatus of claim 3 wherein said blade, in the assembled condition, is deformed in the plane of its width to an extent greater than the elastic limit of the material of said blade whereby said blade acquires a permanent set with only a moderate spring back.

6. The rotary cutting die in accordance with claim 3 wherein the width of said cutter blade body portion is in the range from two to one to six to one with respect to the thickness thereof.

7. The rotary cutting die in accordance with claim 3 wherein the sidewalls of the cutter support groove are disposed at the same angle as the taper of said cutter body portion along the length of the support groove disposed at an angle to a plane passing through the longitudinal axis of said cutter support.

8. The rotary cutting die in accordance with claim 3 wherein the outer surface of said cutter support is deformed proximate the juncture of said cutter blade body portion and said cutter support, said deformation being in the direction of said cutter blade whereby a slight dovetail fit is provided between said cutter blade body portion and said cutter support.

References Cited by the Examiner

UNITED STATES PATENTS

| | | | |
|---|---|---|---|
| 1,498,894 | 6/24 | Steenstrup | 29—521 X |
| 1,777,285 | 10/30 | Adsit | 93—58.2 |
| 2,810,329 | 10/57 | Schmidt et al. | 93—58.2 |
| 3,052,139 | 9/62 | Trimble | 76—107 |

FOREIGN PATENTS

| | | |
|---|---|---|
| 867,049 | 2/53 | Germany. |

GRANVILLE Y. CUSTER, JR., *Primary Examiner.*